Patented Mar. 12, 1935

1,993,782

UNITED STATES PATENT OFFICE 1,993,782

IMPROVEMENTS IN CELLULOSE ACETATE

Clifford I. Haney, Drummondville, Quebec, Canada, assignor to Celanese Corporation of America, a corporation of Delaware No Drawing. Application December 18, 1930, Serial No. 503,238

12 Claims. (Cl. 260—102)

This invention relates to the preparation of cellulose acetate that is soluble in acetone and from which articles may be made which are resistant to the delustering action of boiling water and other aqueous media.

An object of my invention is to prepare cellulose acetate that is soluble in acetone and which at the same time does not tend to delustre readily when subjected to boiling water. Another object of my invention is to form articles such as yarns, filaments, fabrics and other materials from such acetone-soluble cellulose acetate. Other objects of this invention will appear from the following detailed description.

Cellulose acetate of various solubility characteristics can be made, the solubility of the resultant product varying in accordance with the mode of acetylating the cellulose and the various after treatments such as hydrolysis to which the resulting cellulose acetate is subjected. Thus some cellulose acetates are soluble in chloroform, some in acetone, some in mixtures of acetone and alcohol, some in alcohol alone, etc. The cellulose acetates that are considered most useful are those that are soluble in acetone, and the acetone-soluble cellulose acetates heretofore made contain acetyl groups in amounts corresponding to less than 55% determined as acetic acid. However yarns or other articles which are made from the acetone-soluble cellulose acetates heretofore known become completely delustered and opaque when exposed to boiling water, wet steam, hot aqueous solutions and the like, so that care must be exercised in the dyeing, scouring and laundering of fabrics and article made from such yarns.

I have found that cellulose acetate that is soluble in acetone but which is at the same time resistant to a remarkable extent to the delustering action of boiling water, hot aqueous solutions and wet steam, may be made by hydrolyzing or ripening the primary acetylation solution containing the cellulose acetate of high acetyl value to a less extent than has been heretofore done, whereby the final cellulose acetate has an acetyl value of 56 to 60%, and preferably of 57 to 59%, determined as acetic acid.

In accordance with my invention, I prepare cellulose acetate that is soluble in acetone and yet resistant to the delustering action of boiling water and the like by acetylating cellulose in any known or suitable manner and then hydrolyzing the primary cellulose acetate which is of high acetyl content to such a limited extent that while the resultant product is soluble in acetone, it is resistant to the delustering action of boiling water or other hot aqueous media.

For acetylation, the cellulose is treated with an acetylating agent such as acetic anhydride or acetyl chloride in the presence of a catalyst which is preferably sulfuric acid but which may be phosphoric acid, zinc chloride, etc., and in the presence either of a solvent for the resulting cellulose acetate such as acetic acid or a diluent such as benzol. While any suitable method of acetylation may be employed, I prefer to employ those processes described in the U. S. patents of H. Dreyfus Nos. 1,278,885, 1,280,974, 1,280,975 and particularly 1,708,787.

After completion of the acetylation, there is formed a cellulose acetate of high acetyl value corresponding practically to cellulose triacetate. In order to produce a cellulose acetate that is soluble in acetone, it has been the practice to add a substantial amount of water to the primary acetylation solution, and allow the mass to hydrolize or ripen until there is produced a cellulose acetate having an acetyl content of 54% or less, and preferably of 57 to 59% determined as acetic acid. In order to produce an acetone-soluble cellulose acetate that is resistant to delustering, in accordance with my invention, the degree of hydrolysis or ripening to which the original cellulose acetate is subjected is materially reduced. This may be done in various ways such as (1) interrupting the hydrolysis which is performed by the addition of the normal amount of water at an earlier stage so that the final cellulose acetate has an acetyl value of over 56%; (2) adding a reduced amount of water, say from 5% to 20%, preferably 10 to 20%, of the weight of the cellulose originally employed for hydrolysis; (3) neutralizing part of the sulfuric acid or other hydrolizing catalyst present. One, two or three of the above expedients may be employed. In the preferred form of the invention, both the expedients of reduction of the amount of water of addition and neutralization of part of the catalyst are used.

As stated, the hydrolysis or ripening of the primary solution may be interrupted at an earlier stage. As an example of this, if the normal amount of water is added to the acetylation solution, if a temperature of 25° C. is employed, the time of ripening may be 25 hours, after which a large amount of water is added to precipitate the cellulose acetate. This method is not quite as advantageous as the preferred method when sulfuric acid is used as catalyst, owing to the fact that the precipitation of the cellulose acetate is accompanied with some difficulty, the precipitated cellulose acetate is difficult to handle, the cellulose acetate has a somewhat high content of sulfuric acid, and its solubility in acetone is not quite as good as that made by the preferred method.

The second method of reducing the amount of water added for hydrolysis or ripening involves the addition of water in amounts of from 5 to 20% of the weight of the cellulose originally employed for acetylation.

In a third form of this invention, an alkaline material such as the carbonate, bicarbonate or hydroxide of sodium, potassium or ammonium may be added to the primary acetylation product to neutralize part of the sulfuric acid or other catalyst employed during the acetylation. Thus if sulfuric acid is employed as catalyst in amount equal to 10 to 15% of the weight of the cellulose employed, an amount of alkaline material may be added to convert $\frac{1}{15}$ to $\frac{1}{3}$, preferably $\frac{1}{8}$, of the sulfuric acid to the bisulfate. This method, especially when combined with the addition of a reduced amount of water of hydrolysis, is preferred, since the viscosity characteristics of the resulting cellulose acetate are preserved.

After the cellulose acetate has been ripened or hydrolyzed to the desired degree, it is admixed with a large amount of water to precipitate the cellulose acetate, which may then be washed, and stabilized by treating with hot or boiling water containing a small amount of a mineral acid. Since stabilization usually removes small quantities of combined acetyl groups, the ripening of the cellulose acetate is interrupted so that the cellulose acetate after ripening has a somewhat larger acetyl content than is desired in the final stabilized product.

By subjecting the cellulose to pretreatment with acetic anhydride, acetic acid, formic acid or other lower aliphatic acid either in liquid or in vapor form, prior to acetylation, the resistance of the final cellulose acetate to delustering is increased.

The cellulose acetate formed by this invention may be dissolved in a solvent such as acetone to form a spinning solution which may be extruded through fine orifices into an evaporative atmosphere, as in dry spinning, or into a precipitating bath as in wet spinning to form yarns, filaments, horsehair, bristles and the like. Lacquers, coating compositions, plastic compositions, etc. may also be made from this cellulose acetate.

Yarns made from this cellulose acetate may be associated to form woven or knitted fabrics from which hosiery, garments and other articles may be formed.

This invention presents many advantages. Thus yarn made in accordance with this invention although readily soluble in acetone is remarkably more resistant to the delustering action of hot water and is also more strongly resistant to the saponifying action of alkali than is yarn made from the ordinary acetone soluble cellulose acetate. If the yarn is subjected to boiling water for ½ hour, the lustre of the yarn is very similar to that of natural silk.

Fabrics and hosiery made of this yarn do not crease readily and therefore can be given more vigorous processing. This increased resistance to delustering is of great advantage in the dyeing, scouring and laundering of textile materials made in accordance with this invention. Thus a fabric made of natural silk and the cellulose acetate yarn of this invention may be degummed by scouring in hot liquor without danger of delustering the cellulose acetate yarn to a considerable extent. The yarn of this invention is more resistant to dyes for cotton and wool, and therefore in the cross-dyeing of fabric made of this cellulose acetate yarn and cotton or wool, better two-color effects may be obtained.

Highly ornamental effects may be obtained by associating together yarn made in accordance with this invention and which is more resistant to delustering together with yarn made of the acetone-soluble cellulose acetate previously employed which is readily delustered, and then subjecting such fabric to boiling water or other hot aqueous media, whereby differential lustre effects may be produced.

In order further to illustrate my invention but without being limited thereto, the following specific example is given.

*Example*

100 parts by weight of cellulose such as cotton linters or purified wood pulp are acetylated with a mixture of acetic anhydride and acetic acid containing 13 to 15 parts by weight of concentrated sulfuric acid. After completion of the acetylation, there is added to the primary solution of the cellulose acetate formed an amount of water just sufficient to convert the acetic anhydride that remains to acetic acid. Thereupon there is added such an amount of sodium bicarbonate to convert $\frac{1}{8}$ of the sulfuric acid present to sodium bisulfate and at the same time there is also added 19 parts by weight of water for ripening or hydrolysis. The mixture is allowed to ripen at 20 to 30° C. for 40 to 50 hours, whereupon the cellulose acetate is precipitated by the addition of a large amount of water. The precipitated cellulose acetate is washed and stabilized by treatment with hot water containing a small amount of mineral acid such as sulfuric acid. The resulting cellulose acetate has the desirable properties above described and may be used for making yarn or other articles as above set forth.

It is to be understood that the foregoing detailed description is given merely by way of illustration and that many variations may be made therein, without departing from the spirit of my invention.

Having described my invention, what I desire to secure by Letters Patent is:

1. Method of making cellulose acetate that is soluble in acetone and relatively resistant to the delustering action of boiling water comprising acetylating cellulose by means of an acetylating agent in the presence of sulfuric acid as catalyst, partially neutralizing part of the sulfuric acid upon completion of acetylation by the addition of a neutralizing agent in a quantity less than 50% of that equivalent to the sulfuric acid present, and permitting the cellulose acetate to hydrolize until there is formed a cellulose acetate that is soluble in acetone but is relatively resistant to the delustering action of boiling water.

2. Method of making cellulose acetate that is soluble in acetone and relatively resistant to the delustering action of boiling water comprising acetylating cellulose by means of an acetylating agent in the present of sulfuric acid as catalyst, partially neutralizing part of the sulfuric acid upon completion of acetylation by the addition of a neutralizing agent in a quantity less than 50% of that equivalent to the sulfuric acid present, and permitting the cellulose acetate to hydrolize until there is formed a cellulose acetate that is soluble in acetone and has an acetyl value of 56 to 60% determined as acetic acid.

3. Method of making cellulose acetate that is soluble in acetone and is relatively resistant to the delustering action of boiling water comprising acetylating cellulose by means of an acetylating agent in the presence of sulfuric acid as catalyst, partially neutralizing part of the sulfuric acid upon completion of acetylation by the addition of a neutralizing agent in a quantity less than 50% of that equivalent to the sulfuric acid present, adding a limited amount of water and permitting the cellulose acetate to hydrolize until there is formed a cellulose acetate that is soluble in acetone but is relatively resistant to the delustering action of boiling water.

4. Method of making cellulose acetate that is soluble in acetone and is relatively resistant to the delustering action of boiling water comprising acetylating cellulose by means of an acetylating agent in the presence of sulfuric acid as catalyst, partially neutralizing part of the sulfuric acid upon completion of acetylation by the addition of a neutralizing agent in a quantity less than 50% of that equivalent to the sulfuric acid present, adding an amount of water equal to 10% to 20% of the weight of the cellulose and permitting the cellulose to hydrolize until there is formed a cellulose acetate that is soluble in acetone but is relatively resistant to the delustering action of boiling water.

5. Method of making cellulose acetate that is soluble in acetone and relatively resistant to the delustering action of boiling water comprising acetylating cellulose by means of an acetylating agent containing a large excess of acetic anhydride in the presence of sulfuric acid as catalyst, partially neutralizing part of the sulfuric acid upon completion of acetylation by the addition of a neutralizing agent in a quantity less than 50% of that equivalent to the sulfuric acid present, and permitting the cellulose acetate to hydrolize until there is formed a cellulose acetate that is soluble in acetone but is relatively resistant to the delustering action of boiling water.

6. Method of making cellulose acetate that is soluble in acetone and is relatively resistant to the delustering action of boiling water comprising pretreating cellulose with a lower fatty acid, acetylating the pretreated cellulose by means of an acetylating agent in the presence of sulfuric acid as catalyst, partially neutralizing part of the sulfuric acid upon completion of acetylation by the addition of a neutralizing agent in a quantity less than 50% of that equivalent to the sulfuric acid present, and permitting the cellulose acetate to hydrolize until there is formed a cellulose acetate that is soluble in acetone but is relatively resistant to the delustering action of boiling water.

7. Method of making cellulose acetate that is soluble in acetone and is relatively resistant to the delustering action of boiling water comprising acetylating cellulose by means of a mixture of acetic anhydride and acetic acid in the presence of sulfuric acid as catalyst, partially neutralizing part of the sulfuric acid upon completion of acetylation by the addition of a neutralizing agent in a quantity less than 50% of that equivalent to the sulfuric acid present and ripening the solution by the addition in two stages of a ripening agent.

8. Method of making cellulose acetate that is soluble in acetone and is relatively resistant to the delustering action of boiling water comprising acetylating cellulose by means of a mixture of acetic anhydride and acetic acid in the presence of sulfuric acid as catalyst, partially neutralizing part of the sulfuric acid upon completion of acetylation by the addition of a neutralizing agent in a quantity less than 50% of that equivalent to the sulfuric acid present and ripening the solution by the addition of a reduced amount of water, allowing the solution to stand for a substantial period of time and then adding a further quantity of water.

9. Method of making cellulose acetate that is soluble in acetone and is relatively resistant to the delustering action of boiling water comprising acetylating cellulose by means of a mixture of acetic anhydride and acetic acid in the presence of sulfuric acid as catalyst, partially neutralizing part of the sulfuric acid upon completion of acetylation by the addition of a neutralizing agent in a quantity less than 50% of that equivalent to the sulfuric acid present and ripening the solution by the addition of an amount of water just sufficient to convert the excess acetic anhydride into acetic acid, allowing the solution to stand for a substantial period of time and then adding an amount of water equal to 10 to 20% of the weight of the cellulose.

10. Method of making cellulose acetate that is soluble in acetone and is relatively resistant to the delustering action of boiling water comprising acetylating cellulose by means of a mixture of acetic anhydride and acetic acid in the presence of sulfuric acid as catalyst, partially neutralizing part of the sulfuric acid upon completion of acetylation by the addition of a neutralizing agent in a quantity less than 50% of that equivalent to the sulfuric acid present and ripening the solution by the addition of an amount of water just sufficient to convert the excess acetic anhydride into acetic acid, adding an amount of water equal to 10 to 20% of the weight of cellulose and then permitting the cellulose to ripen until there is formed a cellulose acetate that is soluble in acetone and has an acetyl value of 56 to 60% determined as acetic acid.

11. Method of making cellulose acetate that is soluble in acetone and relatively resistant to the delustering action of boiling water comprising acetylating cellulose by means of an acetylating agent in the presence of sulfuric acid as catalyst, partially neutralizing part of the sulfuric acid upon completion of acetylation by the addition of a neutralizing agent in a quantity less than 50% of that equivalent to the sulfuric acid present and permitting the cellulose acetate to hydrolyze until there is formed a cellulose acetate that is soluble in acetone and has an acetyl value of 57 to 59% determined as acetic acid.

12. Method of making cellulose acetate that is soluble in acetone and is relatively resistant to the delustering action of boiling water comprising acetylating cellulose by means of a mixture of acetic anhydride and acetic acid in the presence of sulfuric acid as catalyst, partially neutralizing part of the sulfuric acid upon completion of acetylation by the addition of a neutralizing agent in a quantity less than 50% of that equivalent to the sulfuric acid present and ripening the solution by the addition of an amount of water just sufficient to convert the excess acetic anhydride into acetic acid, adding an amount of water equal to 10 to 20% of the weight of cellulose and then permitting the cellulose to ripen until there is formed a cellulose acetate that is soluble in acetone and has an acetyl value of 57 to 59% determined as acetic acid.

CLIFFORD I. HANEY.

CERTIFICATE OF CORRECTION.

Patent No. 1,993,782. March 12, 1935.

CLIFFORD I. HANEY.

It is hereby certified that error appears in the printed specification of the above numbered patent requiring correction as follows: Page 1, second column, line 18, strike out the words "and preferably of 57 to 59%"; and that the said Letters Patent should be read with this correction therein that the same may conform to the record of the case in the Patent Office.

Signed and sealed this 9th day of April, A. D. 1935

Leslie Frazer (Seal) Acting Commissioner of Patents.